June 21, 1966 A. J. SIPIN 3,256,737
VELOCITY FLOWMETERS
Original Filed Aug. 19, 1958 3 Sheets-Sheet 1
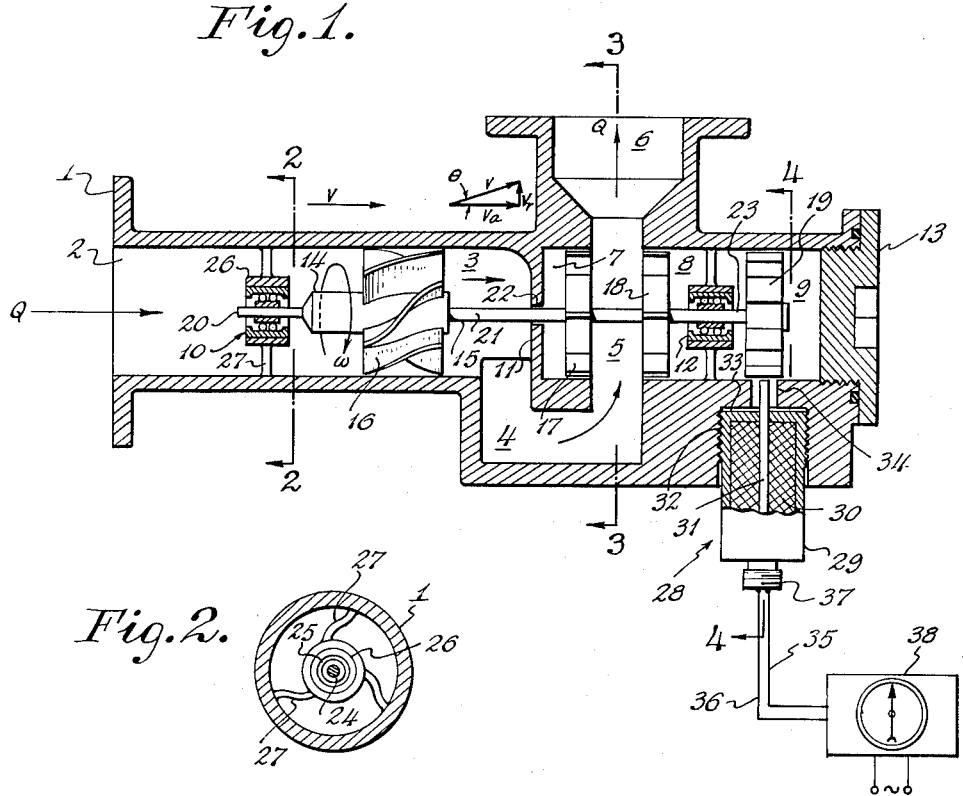
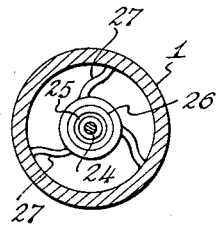
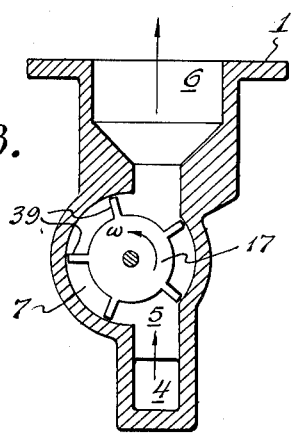
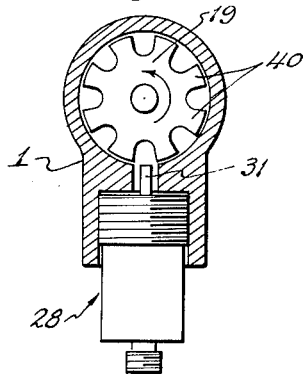
INVENTOR
ANATOLE J. SIPIN
BY
Arthur H. Serrell
ATTORNEY June 21, 1966   A. J. SIPIN   3,256,737
VELOCITY FLOWMETERS
Original Filed Aug. 19, 1958   3 Sheets-Sheet 2
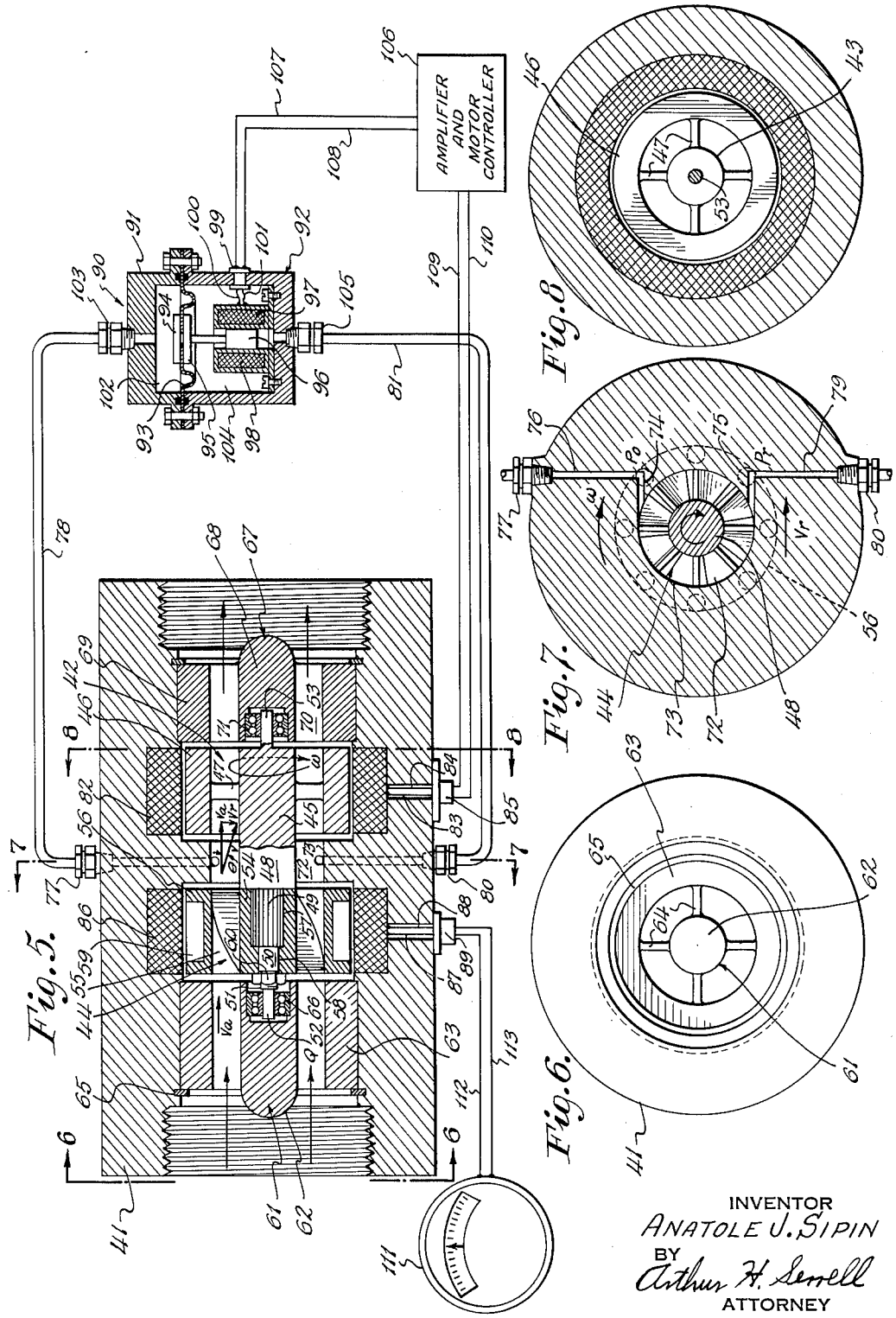
INVENTOR
ANATOLE J. SIPIN
BY
Arthur H. Sewell
ATTORNEY June 21, 1966 A. J. SIPIN 3,256,737
VELOCITY FLOWMETERS
Original Filed Aug. 19, 1958 3 Sheets-Sheet 3
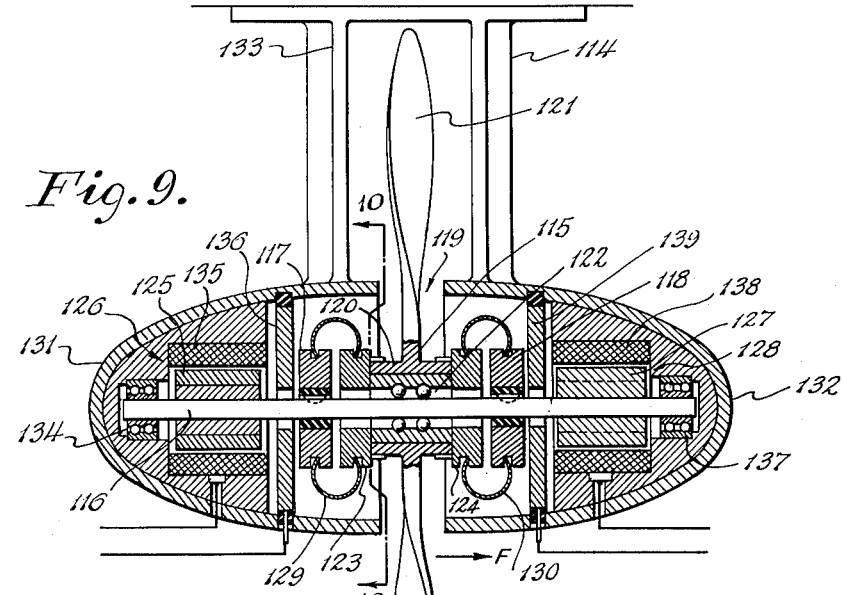
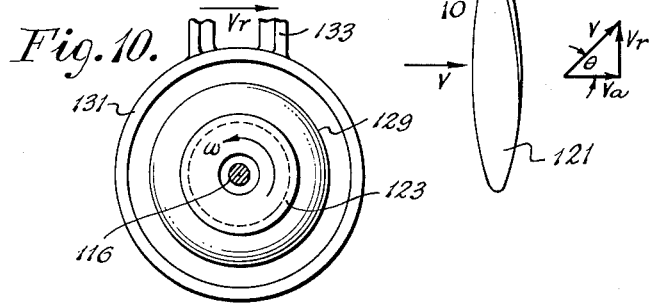
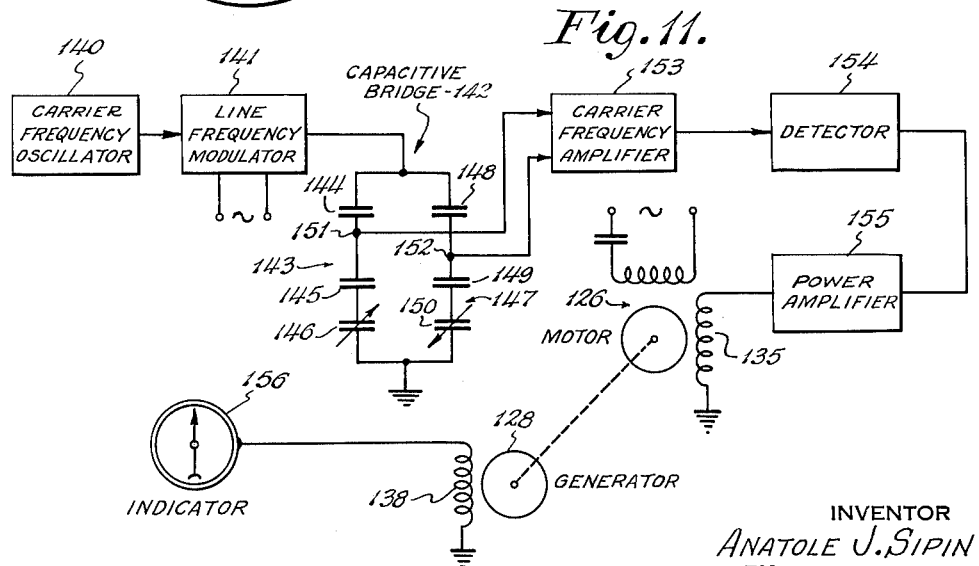
INVENTOR
ANATOLE J. SIPIN
BY
Arthur H. Serrell
ATTORNEY

United States Patent Office 3,256,737
Patented June 21, 1966

3,256,737
VELOCITY FLOWMETERS
Anatole J. Sipin, 117 E. 77th St., New York 21, N.Y.
Continuation of application Ser. No. 755,913, Aug. 19, 1958. This application Aug. 31, 1964, Ser. No. 395,642
4 Claims. (Cl. 73—231)

The present application is a continuation of my now abandoned application Serial No. 755,913, filed August 19, 1958, for an Improvement in Velocity Flowmeters.

In devices of this character, the turbine wheel of the meter is assumed to rotate at a speed directly proportional to the average incoming axial velocity of the fluid. Inasmuch as the flow area at the turbine blades or vanes is constant, the volumetric flow of fluid through the meter is inferred from the speed of the rotating element of the axial flow turbine.

Ideally, all the factors that influence the proportionality betwen the average incoming axial fluid velocity and the rotational speed of the turbine wheel should be constant under all conditions of operation. For a turbine with blades or vanes of uniform and constant pitch, it is necessary that the angular change of velocity experienced by the fluid in passing through the turbine be zero or some constant proportion of the inlet velocity. A change of fluid velocity results in a change of fluid momentum, hence an exchange of mechanical energy between the fluid and the turbine wheel. If the turbine is operating as a motor, that is, if it is being driven by and extracts energy from the fluid, the fluid stream is bent by the turbine blades in a direction opposite to the direction of wheel rotation. If the turbine is operating as a pump, that is, if it is being driven by an external source and supplies energy to the fluid, the fluid stream is bent in the direction of wheel rotation. If the fluid stream is not rotated at all because of the turbine and experiences no angular velocity change in flowing past the turbine blades, there is no change of fluid momentum, and hence there is no mechanical energy exchange between the fluid and the turbine wheel. For every value of the incoming fluid axial velocity, there exists a rotational speed of the turbine wheel such that there is no change in fluid momentum and no relative exchange of energy between the fluid and the turbine wheel. This speed is herein termed the reference speed of the turbine. The deviation of rotational speed from reference speed is termed slip, which is positive when the turbine speed is of greater magnitude and negative when the turbine speed is of lesser magnitude.

In known axial turbine flowmeters, the fluid flow provides the source of power for rotation of the turbine wheel. The fluid flow also supplies energy to operate an output sensing device as well as to overcome bearing friction and viscous drag on the turbine rotor. Since the turbine wheel in this type of meter acts as a fluid motor, it operates always under negative slip, the magnitude of which varies with many factors. The required change of fluid momentum causes an axial downstream thrust to be impressed on the turbine. Thus, thrust bearings are usually required, with an attendant increase of frictional loads. Some meters have an indicator, requiring significant actuating power driven directly by the turbine. With very viscous fluids energy losses due to rotational drag are substantial. All of these loads produce negative slip of a varying and unpredictable nature.

In accordance with the present invention, the meter includes an axial flow turbine with a rotating wheel or element having vanes or blades pitched with reference to the axis in the path of a flowing fluid that provides a downstream rotational component in one direction transverse to the axis when the fluid increases speed and provides a downstream rotational component in a direction opposite to the one direction and transverse to the axis when the fluid decreases speed.

The improved flowmeter includes a means for sensing the rotational fluid velocity component downstream of the vanes or blades of the turbine. It further includes a means responsive to the output of the sensing means for changing the speed of rotation of the wheel or element so that the downstream rotational component of the flowing fluid is restored to null.

Various further and more specific features and advantages of the invention are hereinafter described in connection with the accompanying drawings which show mechanical and electrical forms of the improved flowmeter.

In the drawings:

FIG. 1 is a sectional elevation view of the improved meter showing a mechanical embodiment of the invention, FIG. 2 is a sectional view taken on lines 2—2, in FIG. 1, FIG. 3 is a sectional view taken on lines 3—3, in FIG. 1, FIG. 4 is a sectional view taken on lines 4—4, in FIG. 1, FIG. 5 is a view partly in sectional elevation showing a preferred form of flowmeter embodying the present inventive concepts, FIG. 6 is a sectional view taken on lines 6—6, in FIG. 5, FIG. 7 is a sectional view taken on lines 7—7, in FIG. 5, FIG. 8 is a sectional view taken on lines 8—8, in FIG. 5, FIG. 9 is a view similar to FIG. 5 showing a further embodiment of the improved flowmeter in electrical form, FIG. 10 is a sectional view taken on lines 10—10, in FIG. 9, and FIG. 1 is a combined circuit and block diagram of electrical components utilized in the form of the invention shown in FIG. 9.

The improved meter illustrated in FIGS. 1, 2, 3 and 4, consists of a housing 1, containing a fluid inlet passage 2, a turbine wheel chamber 3, a flow turning passage 4, a motive flow passage 5, a fluid exit passage 6, a left hand turbine housing cavity 7, a right hand turbine housing cavity 8, and a generator rotor chamber 9. Passage 2 is separated from chamber 3 by a left hand bearing assembly 10. Chamber 3 is separated from cavity 7 by a wall 11 which is part of housing 1. Cavity 7, cavity 8, passage 4 and passage 6 all connect with passage 5. Cavity 8 is separated from chamber 9 by a right hand bearing assembly 12. Chamber 9 is separated and sealed from the outside of the housing 1 by a suitable plug 13. The rotating assembly 14 consists of a shaft 15 upon which are mounted an axial flow turbine wheel 16 with helical vanes or blades of constant and uniform pitch and spacing, a left hand tangential flow turbine wheel 17 with flat radial blades, a right hand tangential flow turbine wheel 18 identical with turbine wheel 17, and a wheel 19 with radial teeth. All wheels are rigidly fixed to the shaft. The extreme left hand end 20 of shaft 15 is supported by the left hand bearing assembly 10, the shaft being free to rotate and slide axially within the bearing. The central part 21 of shaft 15 separates turbines 16 and 17 and passes through a close fitting opening 22 in wall 11. The right hand end 23 of shaft 15 is supported by the right hand bearing assembly 12, within which the shaft is free to slide and rotate. The left hand bearing assembly 10 as shown in FIG. 2 consists of a sleeve bearing 24 pressed into a ball bearing 25, which in turn is pressed into a ring housing 26. The ring housing 26 is supported in the fluid passageway by three flat equally spaced cantiliver springs 27 which are anchored in a suitable manner to the inner wall of housing 1. Shaft end 20 slides and rotates within sleeve bearing 24, which being attached to the inner race of ball bearing 25 is free to rotate with respect to the outer race, hence to rotate with respect to housing 26 which is rigidly attached to the outer race of ball bearing 25. Sleeve bearing 24 has no axial motion with respect to housing 26, but is permitted limited axial motion with respect to housing 1 due to flexure of springs 27 which allow axial motion of housing 26 with respect to housing 1. The advantages of this bearing construction will become apparent in the description of the operation of the meter. The components of right hand bearing assembly 12 are identical with those of left hand bearing assembly 10. A tachometer generator pickup 28 consists of a magnetically permeable case 29 which contains an electrical coil 30 and a cylindrical permanent magnet 31 as the coil core. The pickup is screwed into cavity 32 of housing 1 and seats against a bottom surface 33. An opening 34 of slightly larger diameter than magnet 31 extends from surface 33 to the inside of chamber 9. Magnet 31 extends through the opening 34 to the inner surface of chamber 9. There is a small gap between the end of magnet 31 and the outer surface of generator rotor wheel 19. Electrical leads 35 and 36 extend from the coil 30 of pickup 28 through electrical connector 37 to an electrical frequency meter 38 of conventional design.

As shown in FIG. 1, fluid flow represented by arrow Q, enters the housing 1 at passage 2, flows by bearing assembly 10 into chamber 3 through the blades of turbine wheel 16. The fluid then flows into passage 4, where it is turned through one hundred and eighty degrees so as to flow upward through passage 5 into exit passage 6, and out of meter housing 1. The blades of turbine 16 are so pitched that as the fluid moves from left to right as viewed in FIG. 1, turbine wheel 16 and shaft assembly 14 rotate in a clockwise direction at a speed represented by arrow $\omega$. Tangential flow turbine wheel 17 is shown as being totally enclosed by cavity 7, hence, there is no interaction between turbine 17 and the fluid flowing in passage 5. As the shaft assembly 14 moves to the right with flow of fluid through the meter, turbine wheel 17 becomes partially exposed to the fluid stream. It is seen from FIG. 3 that the fluid stream impinges on a partial width of blades 39 of wheel 17 so as to apply torque to the shaft assembly 14 in a counterclockwise direction, looking from the right, which is the same direction of rotation as that of turbine wheel 16. As the shaft assembly 14 moves to the right from the neutral position shown in FIG. 1, the more torque is applied to turbine 17 in the direction of rotation.

The fluid enters the axial flow turbine wheel 16 at an axial velocity V, as represented in the vector diagram. Since the flow area in the turbine 16 is constant, the resultant velocity remains constant in magnitude but variable in direction. The vector diagram at the turbine 16 in FIG. 1 shows the condition when shaft assembly 14 is rotating at less than reference speed, hence with negative slip. The fluid stream is bent in a direction opposite to the direction of rotation and the resultant velocity leaving the turbine is V at an angle $\theta$ with respect to the axis, having an axial component Va and a rotational component Vr. The rotational velocity Vr is proportional to the absolute slip of the shaft assembly and the ratio $Vr/V = \sin \theta$ is proportional to the relative slip with respect to the reference speed. The axial component of exit velocity, Va is equal to $V \cos \theta$ and therefore becomes smaller than V as slip increases. An axial velocity drop exists across turbine 16 in that event and an axial force F is impressed in the direction of flow on turbine 16 and shaft assembly 14. The force F is equivalent to the rate of change of momentum across turbine 16 and $$F = \rho Q(V - Va) = \rho Q V(1 - \cos \theta)$$

where $\rho$ is the density of the fluid, assumed to remain constant. This thrust force F causes the entire shaft assembly 14 to move to the right, gradually exposing the blades 39 of turbine 17 to the fluid stream and applying torque to accelerate the shaft assembly in the direction of rotation, decreasing Vr and $\theta$. Motion to the right continues until Vr and $\theta$ both equal zero, at which time Va equals V and the thrust force F equals zero. The shaft assembly is now rotating at reference speed. In this form of the invention, the meter provides a mechanical output that depends on the change in axial relation between the shaft and its bearings. The rotor speed changing means including turbines 17, 18, operates in accordance with the mechanical output to reduce the rotational fluid velocity component of the fluid downstream the axial turbine 16 to null. For high sensitivity of the shaft assembly to thrust force F the sliding friction of shaft assembly 14 is very small. To minimize friction and protect against seizure the special bearing assemblies 10 and 12 are used. The materials and tolerances of sleeve bearing 24 and shaft sections 20 and 23 are such that if bearing 24 were stationary, it would supply support with little axial or rotating friction. Since bearing 24 is mounted in ball bearing 25, the rotating friction is minimal. If either bearing sticks, the other will still permit free rotation. Springs 27 permit limited axial motion of all bearings. If bearing 24 seizes, flexure of springs 27 will still allow axial motion of shaft assembly 14 to expose turbine 17 to fluid flow; thus, the shaft assembly will be maintained at reference speed with but little variation in accuracy. Opening 22 in wall 11 and shaft section 21 are sized for larger clearance than the end bearings so that there will be no contact between shaft section 21 and wall 11 and, therefore, no friction.

When the turbine is operating at higher than synchronous speed, the rotational component of velocity Vr acts in the opposite direction. Deflection of the fluid is now caused by the blades, however; and the turbine is pumping and accelerating the entire continuum of fluid from its initial condition, much as a rotating screw drives an engaging nut. Simple momentum theory shows that somewhere downstream of the turbine blades the average fluid jet velocity is greater than the average upstream velocity, hence the increased momentum of the fluid reacts to provide an upstream force on the turbine.

The flowmeter shown in FIG. 1 is reversible. If the direction of flow Q is reversed, the direction of rotation and the vectors will be reversed. The thrust force F will act from right to left and turbine 18 will be exposed to the fluid stream. Turbine 17 will be fully protected from the flow at all times. In other respects, the operation will be the same as heretofore described.

The generator rotor wheel 19 is made of magnetically permeable material and acts as a variable reluctance path for the magnetic flux of permanent magnet 31 of the generator pickup 28. When one of the teeth 40 of rotor wheel 19 is opposite the top end of magnet 31, magnetic flux passes from the top end of the magnet, through the tooth, through part of housing 1, through the case 29 of pickup 28 and then to the lower end of magnet 31. When a gap in wheel 19 is opposite magnet 31, the flux passes through the clearance of opening 34 to the housing 1 rather than through the permeable tooth 40. Therefore, with every passage of a tooth by the magnet 31 there is a change in flux density linking the turns of coil 30. Accordingly, a periodic voltage is induced in coil 30 with a frequency proportional to the number of teeth in rotor wheel 19 and the rotational speed of the shaft assembly 14. This frequency is indicated by frequency meter 30 which is calibrated directly in units of fluid flow, since frequency is directly proportional to flow rate. The width of rotor wheel 19 is made large so as to envelope the opening 34. This is done to prevent an overly large reduction in flux density with axial displacement of shaft assembly 14.

The meter, illustrated in FIGS. 5, 6, 7 and 8, consists of a housing 41 with an axial flow passage of varying diameters, such as to provide the required clearances for the stationary inserts and rotating parts. The rotor assembly 42 consists of an integral rotor to which is assembled an axial flow turbine wheel 44. The rotor consists of a central shaft 45 and a rim 46 which are connected by four flat equally spaced radial spokes 47, as shown in FIG. 8. Although these members are shown to be integral, they may also be assembled as separate units. Shaft 45 consists of a large diameter central part 48 to which the spokes are mounted and a smaller diameter splined part 49, a bearing section 50 slightly smaller in diameter than the spline root diameter, a threaded part 51 of smaller diameter than section 50 and a bearing section 52 at one end thereof slightly smaller than the root diameter of section 51. At the other end of shaft 45, there is a bearing section 53 of the same diameter and length as section 52. Turbine wheel 44 consists of a hub 54 to which are attached equally spaced flat or helical blades 55 of constant pitch and cross-section. A rim 56 is attached to the outer extremities of blades 55. Hub 54 has a central internal spline 57 adjoining an opening 58 of smaller diameter. Spline 57 is dimensioned to mate with spline 49 of shaft 45 and opening 58 is dimensioned to bear upon bearing section 50 of shaft 45. Equally spaced permanent magnets 59 are imbedded in the surface of rim 56. Alternatively, rim 56 may be made of permanent magnet material polarized to have successive poles on the surface. Turbine wheel 44 is mounted on shaft 45 and is locked axially by nut 60 which is threaded on part 51. Differential rotary motion is prevented by the mating splines. Flow directing assembly 61 is located to the left of turbine 44. It consists of a hub 62 and a rim 63 with flat radial vanes 64 equally spaced in the annulus formed by hub and rim. The assembly 61 is keyed to housing 41 and held in place axially by snap-ring 65. At its right end the hub 62 contains a centrally located ball bearing 66. A similar vane assembly 67, consisting of hub 68, rim 69, vanes 70 and ball bearing 71, is placed directly to the right of rotor rim 46. Ball bearing 66 supports section 52 of rotor shaft 45. Ball bearing 71 supports section 53 of rotor shaft 45. The flow passage 72 extends between turbine wheel 44 and rim 46 of rotor assembly 42. Passage 72 is an annular space between the internal cylindrical wall 73 of housing 41 and section 48 of shaft 45. Entering upon flow passage 72 and just to the right of turbine 44 are two tangential openings in housing 41, diametrically opposite, one facing in the direction of rotation and the other facing opposite to the direction of rotation of rotor assembly 42. As shown in FIG. 7, opening 74 is at the top of flow passage 72, facing opposite to the direction of shaft rotation and opening 75 is at the bottom of flow passage 72, facing in the direction of shaft rotation. Tangential opening 74 connects to vertical passage 76, which through hydraulic fitting 77 leads to tube 78. Tangential opening 75 connects to vertical passage 79, which through hydraulic fitting 80 leads to tube 81. Electrical coil 82 in housing 41 is the stator of an induction motor of which rim 46 forms a short-circuited rotor. Rim 46 is made of electrically conductive material and can be of squirrel cage, solid, or other suitable construction. Leads 83 and 84 supply electrical power to coil 82 from electrical fitting 85. Electrical coil 86 is the stator of a permanent magnet generator of which rim 56 of turbine 44 is the rotor. Leads 87 and 88 carry the output of coil 86 to electrical fitting 89.

Differential pressure sensor 90 consists of an upper housing 91 secured to a lower housing 92. A convoluted diaphragm 93 is clamped at its outer edge between the two housings. Inside of its convolution the diaphragm is supported between two connected plates 94 and 95, which are attached to the movable magnetically permeable core 96 of a linear differential transformer 97. Coil 98 of transformer 97 is electrically connected to fitting 99 through leads 100 and 101. Upper fluid chamber 102 of differential pressure sensor 90 is connected through fitting 103 to tube 78. Lower fluid chamber 104 is connected through fitting 105 to tube 81. The described portion of the improved flowmeter provides a differential sensor located in the housing downstream of the blades or vanes having a member such as port 74 responsive to the rotational velocity component of the fluid in one direction transverse to the axis when the fluid increases speed and having a member such as port 75 responsive to the rotational velocity component of the fluid in a direction opposite to the one direction and transverse to the axis when the fluid decreases speed. The noted sensing portion further includes a structure in the housing of the meter downstream of the axial flow turbine with members having the directivity of the rotational velocity components with respect to the axis and a differential output.

The amplifier shown at 106 is a simple linear device of conventional design which accepts an electrical voltage from the linear variable differential transformer 97 through leads 107 and 108 and provides a proportional voltage of greatly increased magnitude to the control phase of the two-phase winding 82 through leads 109 and 110 and electrical fitting 85 in housing 41.

Flow indicator 111 is a voltmeter of any conventional type. It receives the output of the tachometer generator from electrical fitting 89 in housing 41 through leads 112 and 113. Indicator 111 measures the voltage output of coil 86 but the dial is calibrated in terms of flow rate.

As shown by the arrow Q in FIG. 5, fluid enters housing 41 from the left and flows by vanes 64, which remove any initial rotary or radial components of velocity, assuring an axial velocity for the fluid entering the turbine blades 55. The turbine blades are so pitched that with fluid flowing from left to right the turbine 44 and, therefore, the shaft assembly 42 has a counterclockwise rotational speed $\omega$ looking in the direction of flow. If the turbine is rotating with negative slip, the axial turbine inlet fluid velocity $Va$ is rotated in passing through the turbine blades so that the resultant fluid velocity in passage 72 is V, at an angle $\theta$ with its axial component $Va$ and having a rotational component $Vr$ normal to $Va$ and in a direction opposite to the direction of shaft rotation. The vector diagram in FIG. 5 should not be misinterpreted because of its location in the passage 72. $Vr$ signifies a rotational velocity component normal to the axis of flow. From passage 72, the fluid flows by the spokes 47 of shaft 43, by the bearing 71 of support assembly 67 and thence leaves housing 41.

With reference to FIG. 7, it is seen that the pressure $Po$ at opening 74 is at most the static fluid pressure $Ps$ in the passage 72, whereas the pressure $Pr$ at opening 75 is the static fluid pressure plus the dynamic fluid pressure due to the rotational velocity. Where $\rho$ symbolizes fluid density, $Pr = Ps + \rho V^2 r / 2$. The pressure $Po$ at opening 74 is also the pressure in passage 76, tube 78 and chamber 102 of differential pressure sensor 90. The pressure $Pr$ at opening 75 is also the pressure in passage 79, the tube 81 and chamber 104 of differential pressure sensor 90. Thus, the downward force $Fd$ on the top of diaphragm 93 is equal to pressure $Po$ multiplied by the effective area $Ae$ of diaphragm 93. The upward force $Fu$ on the bottom of diaphragm 93 is equal to pressure $Pr$, multiplied by the effective area $Ae$ of diaphragm 93. The net force $Fn$ actuating magnetic core 96, is equal to the difference between the upward and downward forces:

$$Fn = Fu - Fd = PrAe - PoAe = Ae\left(Ps + \rho\frac{V^2r}{2} - Ps\right)$$

$$Fn = Ae\rho\frac{V^2r}{2}$$

The net force then is proportional to the square of rotational velocity. With the turbine rotating below synchronous speed, there is a force tending to move the magnetic core 96 of differential transformer 97 upward. This causes an increased output in the upper secondary winding of the linear differential transformer 97 and a decreased output in the lower secondary winding, providing an increased voltage in leads 107 and 108 with the electrical phase required by the control winding of the two-phase coil 82 in order to provide an increased torque on rim 46 in the direction of rotation, thus accelerating shaft assembly 42. The turbine will then increase in speed until it reaches synchronous or reference speed, at which point the rotational fluid velocity V$r$, FIG. 7, in passage 72 will be zero, the pressures on opposite sides of diaphragm 93 will be balanced and there will be no further motion of core 96, hence no further acceleration of shaft 42. If the axial flow turbine wheel 44 is rotating above synchronous speed, the pressure at opening 74 and chamber 102 will be higher than that in opening 75 and chamber 104 and the core 96 will move downward thus decreasing torque on rim 46 and decelerating shaft 42 until synchronous speed has been attained, when the pressures at openings 74 and 75 will be equal and motion of core 96 will stop. If the core travels below its central null position, there will be an increased output in the lower secondary winding of the linear differential transformer 97 and a decreased output in the upper secondary winding, providing an increased voltage in leads 107 and 108, but of reversed electrical phase. The amplified voltage applied to the control winding of coil 82 now provides an increased torque to rim 46 in a direction opposite to rotation, thus decelerating shaft assembly 42. When the core is in its central null position, synchronous speed can only be achieved if there is zero load on the rotating assembly. Normally, core 96 will be above its central position, moving below this point only during transients or zero shifts in amplifier 106. In this form of the invention the sensing means or actuator is responsive to the rotational fluid flow component.

The rotation of permanent magnets 59 in rim 56 of turbine 44 generates a voltage in coil 86 whose frequency depends on the number of magnets and speed of turbine rotation and whose voltage depends on the magnetic strength as well as number of magnets and speed of rotation. Considering all factors except rotational speed to remain constant, it is seen that both frequency and voltage are direct measures of speed. A voltmeter 111 is used to indicate the voltage output of coil 86, hence indirectly turbine rotational speed and fluid flow rate.

FIGS. 9, 10 and 11 show an electrical embodiment of the invention. This type of meter is especially suited for the measurement of velocities in large fluid bodies such as wind velocity and river or ocean currents. The meter consists of a stationary assembly 114 and a rotating assembly 115. The rotating assembly consists of a central shaft 116, upon which are mounted a left hand rotating capacitor plate 117, a right hand rotating capacitor plate 118, and a slidable rotating turbine assembly 119. Plates 117 and 118 are electrically insulated from shaft 116. The turbine assembly consists of a propeller-type turbine 120 with a hub and with multiple blades 121 of conventional section. Turbine 120 is mounted on shaft 116 through rotating ball bushing 122. The turbine assembly has a left hand end plate 123 and a right hand end plate 124. Both end plates have a substantial clearance with shaft 116. At its left end the shaft 116 also carries the short-circuited rotor 125 of an induction motor 126. At its right end the shaft carries the permanent magnet rotor 127 of an alternating current generator 128. Plate 123 is attached to plate 117 through a partially toroidal spring 129. Plate 124 is attached to plate 118 through partially toroidal spring 130. Turbine assembly 119 is rotated at the same speed and angle as shaft 116 by plate 117 through spring 129 and by plate 118 through spring 130. Although no rotational motion can occur, relative axial motion between turbine assembly 119 and shaft 116 takes place due to the flexure of springs 129 and 130. The respective springs are suitably insulated from the plates that the same connect.

The stationary assembly 114 consists of a left hand housing 131, a right hand housing 132 and a support bracket 133. Left hand housing 131 contains a left hand shaft ball bearing 134, the stator coil 135 of the induction motor 126 and a stationary left hand capacitor plate 136. Right hand housing 132 consists of a right hand shaft ball bearing 137, the stator coil 138 of generator 128 and a stationary right hand capacitor plate 139. Plate 136 is electrically insulated from housing 131. Plate 139 is electrically insulated from housing 132. The rotating assembly 115 is supported in the stationary assembly 114 by bearings 134 and 137.

With reference to FIG. 7, a constant carrier frequency voltage, preferably in the middle audio region, is generated by an oscillator 140 which supplies carrier frequency to a modulator 141, where the carrier frequency is modulated by a line frequency at constant voltage. The modulated carrier is fed to a capacitive bridge 142 consisting of one leg 143 with fixed capacitors 144 and 145 and variable capacitor 146 and a second leg 147 with fixed capacitors 148 and 149 and variable capacitor 150. One balance point 151 is between capacitors 144 and 145. The other balance point 152 is between capacitors 148 and 149. Any voltage difference between the balance points is fed to an amplifier 153 from which an amplified voltage at carrier frequency is fed to detector 154 where the carrier frequency is filtered. A signal at line frequency is passed from the detector 154 to a power amplifier 155 whose line frequency output is applied to coil 135, the control phase of split-phase induction motor 126. Fixed capacitor 145 of leg 143 is formed by plates 136 and 117. Variable capacitor 146 is formed by plates 117 and 123. Fixed capacitor 149 of leg 147 is formed by plates 139 and 118. Variable capacitor 150 is formed by plates 118 and 124. Capacitors 146 and 150 are inversely related to the axial position of turbine assembly 119. When turbine assembly 119 is in its center position, capacitors 146 and 150 are equal and the bridge is balanced. If turbine assembly 119 moves to the right of its center position, the gap between plates 124 and 118 decreases, increasing the value of capacitor 150. Also, the gap between plates 123 and 117 increases, decreasing the valve of capacitor 146. The bridge is now unbalanced, and a voltage with a particular phase identified with motion to the right of the turbine assembly is fed to the carrier frequency amplifier 153 causing a torque to be applied to the rotor of motor 126 in the associated direction.

The propeller type blades 121 of turbine 120 are so pitched that with fluid flowing from left to right the direction of rotation is clockwise, looking in the direction of flow. If the rotational speed of the turbine assembly is less than the reference speed for a given flow rate, the resultant fluid velocity will be bent by blades 121 through an angle $\theta$ opposite to the direction of rotation, and there will be an axial force F in the direction of flow proportional to the change in magnitude of axial velocity $(V-Va)$. This force will cause the turbine assembly to move to the right, producing the capacitive changes discussed above, and causing a torque to be applied in a direction to accelerate shaft 116 in the direction of rotation until the reference speed has been reached. If the rotational speed of the turbine is above the reference speed for a given flow rate, the turbine will move to the left and a decelerating torque will be applied to the shaft. Because of the use of capacitors to sense axial position very little motion of the turbine assembly is required for full torque application. Thus, the axial opposing forces of the toroidal springs are minimized. Friction is minimized due to the fact that there is only relative axial motion between the turbine assembly 119 and the shaft 116 permitting the use of a ball bushing, or a ball spline, either of which would be protected from dirt by the toroidal springs at both ends of the turbine assembly.

Since rotor 127 of generator 128 and turbine assembly 119 are driven by the same shaft 116, the voltage output of stator coil 138 is proportional to turbine speed, hence fluid velocity. The output of coil 138 is fed to indicating voltmeter 156 which is calibrated in terms of fluid velocity.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A velocity flowmeter including an axial flow turbine having a housing with a longitudinal axis, a wheel rotating about the axis having radial vanes pitched in the path of a fluid flowing along the axis to provide a rotational velocity component downstream of the vanes in one direction transverse to the axis when the fluid increases speed and provide a rotational velocity component downstream of the vanes in a direction opposite to the one direction and transverse to the axis when the fluid decreases speed, a structure in the housing downstream of the vanes with members having the directivity of the rotational velocity components with respect to the axis providing a differential output, means responsive to the output of the differential structure for changing the rotational speed of the wheel to reduce the rotational fluid velocity component to null, and means dependent on the rotational speed of the wheel for measuring the velocity of the fluid flowing through the turbine.

2. A velocity flowmeter including a turbine of the axial flow type having a housing with a longitudinal axis, an element rotating about the axis having blades pitched in the path of a fluid flowing along the axis, a differential sensor located in the housing downstream of the blades having a member responsive to the rotational velocity component of the fluid in one direction transverse to the axis when the fluid increases speed and having a member responsive to the rotational velocity component of the fluid in a direction opposite to the one direction and transverse to the axis when the fluid decreases speed, a driver for rotating the element operable in accordance with the output of the differential sensor to reduce the downstream rotational fluid velocity component to null, and velocity measuring means responsive to the speed of rotation of the element.

3. A velocity flowmeter including an axial flow turbine with a wheel having vanes pitched in the path of a flowing fluid to rotate at a related reference speed and deflect the fluid into a helical path having a downstream rotational fluid velocity component related in magnitude and direction to the difference between the actual fluid flow rate and the fluid flow rate at the reference speed of rotation of the wheel, means for sensing the rotational fluid flow component including a pair of opposed ports located in tangential transverse relation to the helical flow path downstream of the vanes providing a differential pressure output, means for changing the speed of rotation of said wheel operable in accordance with the differential pressure output of said sensing means to reduce the rotational fluid velocity component to null, and means operable in accordance with the speed of rotation of said wheel providing a measure of the actual fluid flow rate.

4. A velocity flowmeter including a turbine of the axial flow type having an element with blades pitched in the path of a flowing fluid to rotate at a related reference speed and deflect the fluid into a helical path having a downstream rotational fluid velocity component related in magnitude and direction to the difference between the actual fluid flow rate and flow rate of the fluid at the reference speed of the turbine element, an actuator with a part located in downstream relation to the blades responsive to the rotational fluid velocity component, means for changing the speed of rotation of said element operable in accordance with the output of said actuator to reduce the rotational fluid velocity component to null, and means operable in accordance with the speed of rotation of said element for measuring the actual fluid flow, the differential output actuator part including two opposed ports located in tangential transverse relation to the fluid flow path downstream of the blades.

References Cited by the Examiner

UNITED STATES PATENTS

| 1,467,565 | 9/1923 | Blair | 73—230 |
| 2,355,921 | 8/1944 | Mercier et al. | 73—187 |
| 2,747,403 | 5/1956 | Stevenson | 73—231 X |
| 2,800,021 | 7/1957 | Gehre | 73—231 |

FOREIGN PATENTS

| 758,094 | 9/1956 | Great Britain. |

RICHARD C. QUEISSER, *Primary Examiner.*

DAVID SCHONBERG, E. D. GILHOOLY,
*Assistant Examiners.*